United States Patent Office 3,367,919
Patented Feb. 6, 1968

3,367,919
COPOLYMERS FORMED BY REACTING TEREPH-
THALALDEHYDE WITH UNSATURATED MONO-
MER UTILIZING A FRIEDEL-CRAFTS CATALYST
Albert A. Fournier, Jr., Oakland, N.J., assignor to
Uniroyal Inc., a corporation of New Jersey
No Drawing. Filed June 24, 1963, Ser. No. 290,207
4 Claims. (Cl. 260—73)

This invention relates to new copolymers.

The copolymers of the present invention are copolymers of terephthalaldehyde and a monoolefinic compound.

The copolymers of the present invention are prepared by reaction of approximately equimolar quantities of the terephthalaldehyde and the monoolefinic compound in the presence of an acid acting catalyst, viz, a metallic halide Friedel-Crafts catalyst, such as aluminum chloride, boron trichloride and boron trichloride etherate (boron trichloride-diethyl ether complex). Other metallic halide Friedel-Crafts catalysts are chlorides of antimony, iron, tellurium, tin, titanium, bismuth, zinc and mercury. The temperature of the polymerization reaction is not critical and may be from −20° C. to +30° C. The monoolefinic compounds that are copolymerizable with terephthalaldehyde are those having a terminal methylene group, viz, compounds having the general formula

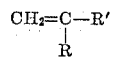

where R is hydrogen or methyl and R' is alkyl having 1 to 5 carbon atoms, aryl (e.g. phenyl), or alkoxy having 1 to 12 carbon atoms. Examples of such monoolefinic compounds are propylene, isobutylene, styrene, alpha-methyl styrene, vinyl alkyl ethers, such as methyl vinyl ether, ethyl vinyl ether, butylvinyl ether. The reaction is carried out by adding the monoolefinic compound to a solution of the terephthalaldehyde in an organic solvent containing the Friedel-Crafts catalyst. Examples of organic solvent media are benzene, nitroethane, nitromethane, nitrobenzene, toluene, tetrahydrofuran, and ether.

The following examples illustrate the invention:

EXAMPLE I

This example illustrates the preparation of a copolymer of terephthalaldehyde and methyl vinyl ether.

Methyl vinyl ether is purified by passing it over activated alumina into a preweighed vial immersed in Dry Ice. The vial is equipped with a diaphragm enabling the gas to be metered through a hypodermic needle into the reaction flask.

A solution of 9.58 grams (0.072 M) of terephthalaldehyde and 0.02 ml. of boron trifluoride etherate in 150 ml. of dry benzene is prepared. Methyl vinyl ether, 4.15 grams (0.072 M) is then introduced with stirring below the liquid surface while the temperature is maintained between 25 and 26° C. At the end of the addition a yellow color has developed. The reaction mixture is allowed to stand for about forty minutes, then the catalyst is destroyed by the addition of about 10 ml. of 10 percent (by weight) sodium hydroxide, whereupon the yellow color disappears. After washing several times in water, the solution is dried over magnesium sulfate and concentrated under reduced pressure. There is thus produced about 11 grams of a solid product, an aliquot of which is freeze-dried and submitted for analysis. Found: C, 68.88; H, 6.25; molecular weight, 571. Calculated for a 3:2 molar ratio of terephthalaldehyde to methyl vinyl ether, $C_{30}H_{30}O_8$: C, 69.3; H, 5.9; molecular weight, 519.

The products of this and the following examples form continuous films when cast from a solution in benzene, suitable for application to metal surfaces to form non-corrosive coatings on the metal.

EXAMPLE II

This example illustrates the preparation of a copolymer of terephthalaldehyde and isobutylene.

Isobutylene is purified by passing it over barium oxide and it is then condensed in a vial.

A solution of 5.70 grams (0.043 M) of terephthalaldehyde and approximately 0.06 gram of boron trifluoride in 40 ml. of nitroethane is prepared. Isobutylene, 2.38 grams, (0.042 M) is added at 25° C. over a period of about twenty-two minutes. The solution is allowed to stir for an additional hour and then the catalyst is destroyed with triethylamine. Ethyl ether is added and the solution is washed several times with water. After drying over magnesium sulfate, the solution is concentrated to leave a white solid. After freeze-drying, it has a melting point of 73 to 80° C.

Analysis.—Found: C, 74.71; H, 6.71; molecular weight, 500. Calculated for a 3:2 molar ratio of terephthalaldehyde to isobutylene: C, 74.7; H, 6.68; molecular weight, 514.

EXAMPLE III

This example illustrates the preparation of a copolymer of terephthalaldehyde and alpha-methylstyrene.

Alpha-methylstyrene is purified by passing through a column of alumina, then stored in a bottle equipped with a rubber diaphragm. The amount required is withdrawn with a hypodermic needle just prior to use.

A mixture of 14.13 grams (0.105 M) of terephthalaldehyde and 0.1 ml. of boron trifluoride etherate in 200 ml. of nitroethane is prepared and to it is added, over a period of one hour, 12.45 grams (0.105 M) of alpha-methylstyrene at −20° C. Some undissolved terephthalaldehyde is still present but dissolves when the temperature is raised to −10° C. The mixture is stirred overnight at −10° C., then the catalyst is destroyed by the addition of triethylamine. The product is taken up in chloroform and the chloroform solution is washed four times with water. After drying in the chloroform solution over magnesium sulfate and concentrating it under reduced pressure, there is obtained 25.6 grams (96 percent of theory) of a white brittle solid. A 10 gram portion is dissolved in 30 ml. benzene and precipitated in 130 ml. methanol to yield 8.1 grams of a white solid melting at 186 to 198° C. and having a molecular weight of 1500.

Analysis.—Found: C, 80.53; H, 6.51. Calculated for a 6:5 molar ratio of terephthalaldehyde to alpha-methylstyrene: C, 80.2; H, 6.2; molecular weight, 1396.

In view of the changes and modifications that may be made without departing from the principles underlying the invention, reference should be made to the appended claims for an understanding of the scope of the protection afforded the invention.

Having thus described my invention, what I claim and desire to protect by Letters Patent is:

1. A copolymer formed by reacting, in an organic solvent, substantially equimolar quantities of terephthalaldehyde and a compound having the formula

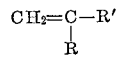

wherein R is hydrogen or methyl and R' is an alkyl radical having 1 to 5 carbon atoms, an aryl radical, or an alkoxy radical having 1 to 12 carbon atoms at a temperature of from $-20°$ C. to $+30°$ C. in the presence of a Friedel-Crafts catalyst.

2. A copolymer formed by reacting, in an organic solvent, substantially equimolar quantities of terephthalaldehyde and isobutylene at a temperature of from $-20°$ C. to $30°$ C. in the presence of a Friedel-Crafts catalyst.

3. A copolymer formed by reacting, in an organic solvent, substantially equimolar quantities of terephthalaldehyde and alpha-methylstyrene at a temperature of from $-20°$ C. to $+30°$ C. in the presence of a Friedel-Crafts catalyst.

4. A copolymer formed by reacting, in an organic solvent, substantially equimolar quantities of terephthalaldehyde and methyl vinyl ether at a temperature of from $-20°$ C. to $+30°$ C. in the presence of a Friedel-Crafts catalyst.

References Cited
UNITED STATES PATENTS

| | | | |
|---|---|---|---|
| 3,166,532 | 1/1965 | Sweeney | 260—67 |
| 2,543,312 | 2/1951 | Copenhaver | 260—73 |
| 3,076,786 | 2/1963 | Brown et al. | 260—67 |

FOREIGN PATENTS

| | | |
|---|---|---|
| 614,946 | 7/1962 | Belgium. |
| 522,683 | 3/1956 | Canada. |
| 1,272,971 | 8/1961 | France. |

OTHER REFERENCES

Shorygina et al., "Synthesis of Styrene-Formaldehyde Copolymers," Zhurmal Prikladnoi Khimii, vol. 33, No. 1, pp. 251–253, January 1960.

JAMES A. SEIDLECK, *Primary Examiner.*